United States Patent
Iwasa

(10) Patent No.: US 8,477,687 B2
(45) Date of Patent: Jul. 2, 2013

(54) WIRELESS MESH NETWORK SYSTEM AND CONTROL METHOD THEREOF, AND WIRELESS DEVICE

(75) Inventor: Tadashi Iwasa, Chiba-ken (JP)

(73) Assignee: Futaba Corporation, Chiba-Ken (JP)

( * ) Notice: Subject to any disclaimer, the term of this patent is extended or adjusted under 35 U.S.C. 154(b) by 850 days.

(21) Appl. No.: 12/591,021

(22) Filed: Nov. 5, 2009

(65) Prior Publication Data

US 2010/0118775 A1    May 13, 2010

(30) Foreign Application Priority Data

Nov. 10, 2008 (JP) ................................. 2008-288101

(51) Int. Cl.
  *G01R 31/08* (2006.01)
(52) U.S. Cl.
  USPC ........... 370/328; 370/325; 370/227; 370/247; 370/251; 370/263
(58) Field of Classification Search
  None
  See application file for complete search history.

(56) References Cited

U.S. PATENT DOCUMENTS

| 6,856,599 B1 * | 2/2005 | Kroon ........................... 370/236 |
| 2007/0002804 A1 * | 1/2007 | Xiong et al. .................. 370/335 |

FOREIGN PATENT DOCUMENTS

| JP | H02-109445 | 4/1990 |
| JP | 2007-135130 | 5/2007 |

OTHER PUBLICATIONS

Office Action dated Dec. 4, 2012 for Japanese Application No. 2008-288101.

* cited by examiner

*Primary Examiner* — Brandon Renner
*Assistant Examiner* — Abdelnabi Musa
(74) *Attorney, Agent, or Firm* — Bacon & Thomas, PLLC

(57) ABSTRACT

A wireless mesh network system includes a plurality of wireless devices adapted to forward a message packet. Each of the wireless devices includes a transmitting unit, a receiving unit, a communications controller, and a RAM. Further, the communications controller controls such that an original source address contained in a message packet forwarded by a wireless device, which is an address of the wireless device that has firstly transmitted the message packet, and a packet number that identifies the message packet are stored in the RAM, and controls such that a message packet received is forwarded if information contained in the message packet received is not consistent with information of the original source address and the packet number stored in the RAM.

10 Claims, 12 Drawing Sheets

FIG.3

| PREAMBLE 24/34 BYTE | SYNCHRONIZATION 2 BYTE | LENGTH 1 BYTE | CONTROL DATA 9 BYTE | SOURCE ID 6 BYTE | MESSAGE 46 BYTE | CRC 2 BYTE |
|---|---|---|---|---|---|---|

FIG. 4

| | BIT 7 | BIT 6 | BIT 5 | BIT 4 | BIT 3 | BIT 2 | BIT 1 | BIT 0 |
|---|---|---|---|---|---|---|---|---|
| 0 | DESTINATION ADDRESS 000~255 ||||||||
| 1 | SOURCE ADDRESS 000~254 ||||||||
| 2 | PACKET TYPE ||||| 0=RESPONSE PERMISSION<br>1=RESPONSE REJECTION | 0=TXT<br>0=TBN | RESERVE | 0 : PK<br>1 : HL |
| 3 | PACKET NUMBER 0~255 ||||||||
| 4 | VALID DATA LENGTH 0~46 ||||||||
| 5 | FREQUENCY NUMBER 2~82 ||||||||
| 6 | REMAINNING NUMBER OF RETRANSMISSION ATTEMPTS |||| NUMBER OF FORWARDING ATTEMPTS (TTL) 0~15 ||||
| 7 | RESERVE 0~50 ||||||||
| 8 | ORIGINAL SOURCE ADDRESS 000~254 ||||||||

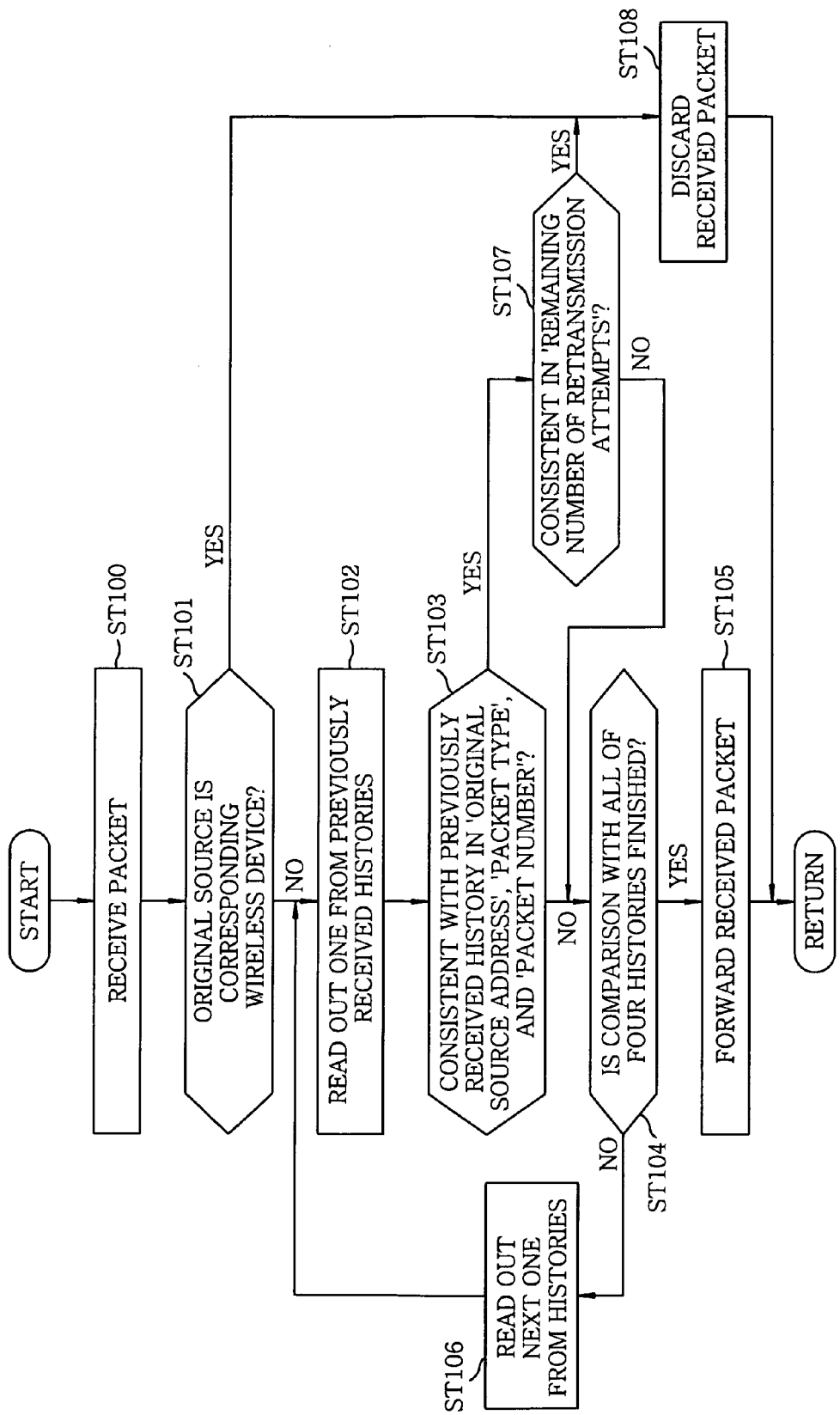

FIG.7

| | ORIGINAL SOURCE ADDRESS | PACKET TYPE | PACKET NUMBER | REMAINING NUMBER OF RETRANSMISSION ATTEMPTS |
|---|---|---|---|---|
| HISTORY 1 | ××H | △H | **H | *H |
| HISTORY 2 | ××H | △H | *△H | *H |
| HISTORY 3 | ××H | △H | *○H | *H |
| HISTORY 4 | ××H | △H | *□H | *H |

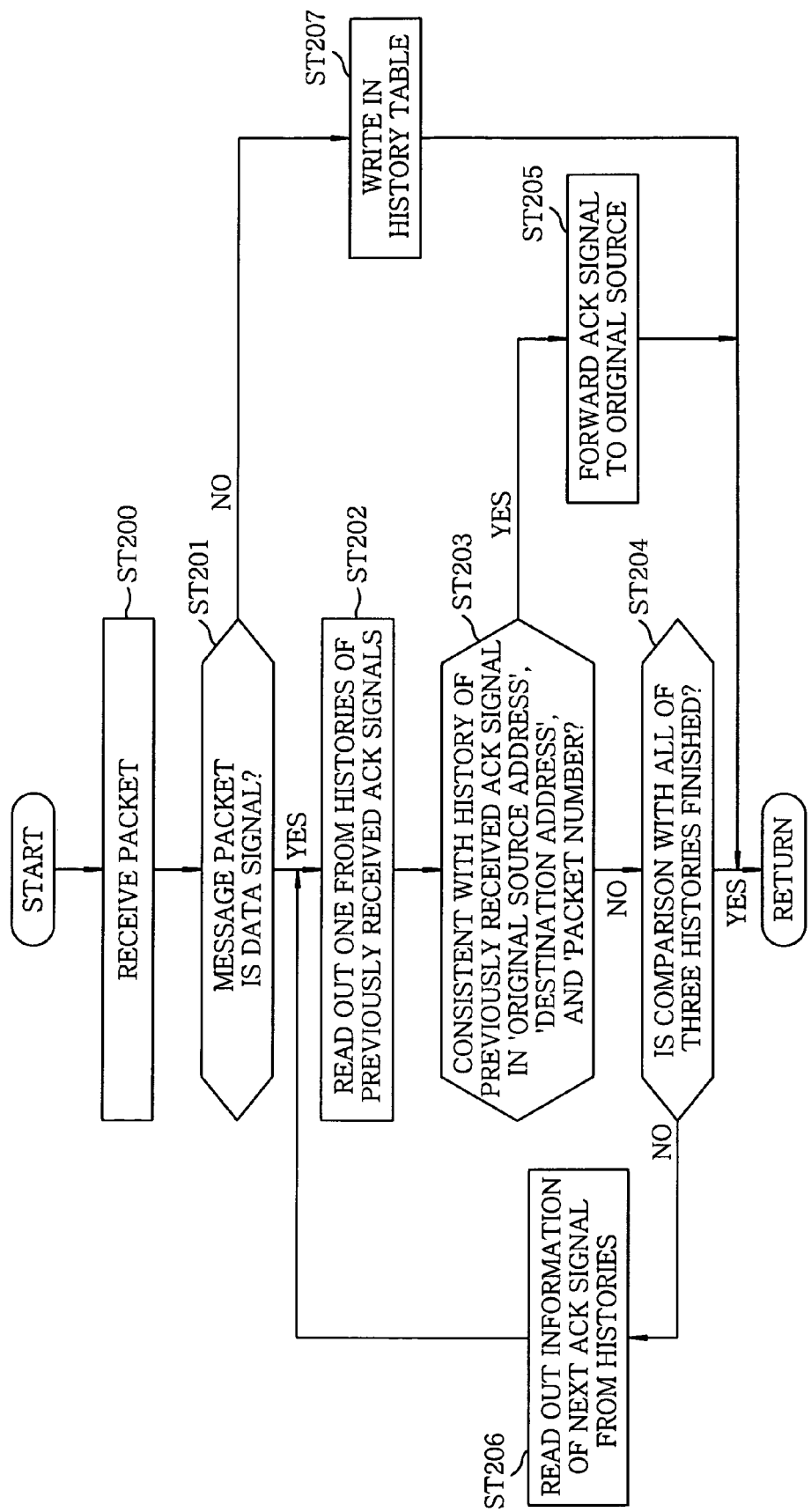

WIRELESS MESH NETWORK SYSTEM AND CONTROL METHOD THEREOF, AND WIRELESS DEVICE

FIELD OF THE INVENTION

The present invention relates to a wireless mesh network system and a control method thereof and a wireless device, which are preferably applied, for example, to a small-scale network having a relatively small number of wireless devices.

BACKGROUND OF THE INVENTION

In recent years, a wireless mesh network (also known as a wireless mesh network system), which organically combines a plurality of wireless devices by a wireless mesh, has been drawing attention (see Non-Patent Document 1). The wireless mesh network functions effectively by having a plurality of wireless devices (wireless stations) scattered around such that it can concentrate data at a point and make it possible to have communications from a particular wireless device to another particular wireless device even when direct one-to-one communications therebetween are not possible.

In case the wireless device is a mobile terminal, the wireless mesh network is usually formed as an ad-hoc network. In the ad-hoc network, data is transmitted from a transmitting node to a receiving node via a plurality of wireless devices serving as wireless terminals (nodes). This technology is also referred to as a multi-hop, and a routing (selective control of paths) method has been suggested as a typical example thereof (see Patent Documents 1 and 2).

In the routing method, a communications path is specified by providing a routing table in each of the wireless devices. As an example, there has been suggested an ad-hoc on-demand distance vector (AODV) wherein each node knows only the next relay station. Further, as for a communications protocol, ZIGBEE (registered trademark) serving as the standard for Low Rate Wireless Personal Networks, LR-WPANs (IEEE 802.15.4), is known as a typical example (see Non-Patent Document 2).

As another multi-hop technology, a flooding method is known (see Non-Patent Document 1). In the flooding method, a wireless device receives data from another wireless device and continuously and unconditionally transmits data on its own accord and, by repeating reception and transmission like this, the data is finally forwarded to a destination wireless device.

However, since the routing method is based on 'distributed processing' in which there exists no station for centrally controlling each wireless device, information about other wireless devices capable of local communications is required. Also, such information needs to be stored in a memory of each wireless device, and the capacity of the memory ranges from 400 B (byte) to 3 KB (kilobyte).

This size of the memory capacity has been a heavy burden on the premise that an embedded small central processing unit (CPU) is used for a communications controller of a wireless device. Due to this, making the wireless device smaller has been difficult. Moreover, routing processes are complicated and thus a CPU for executing the routing processes needs to have a high processing capability. Therefore, the prices of CPUs are high and power consumption is high.

Further, in the routing method, there may be needed changing a communications path depending on a change in the propagation state of radio waves regardless of whether each wireless device is a mobile or in a fixed position. Accordingly, the processing load of the CPU has become burdensome. Especially, in case a wireless device serving as a communications terminal is a mobile terminal, proper communications cannot be achieved unless the communications path is changed every moment. Therefore, path search needs to be made at regular intervals, which further increases the processing load of the CPU.

Additionally, for example, in the event of a failure of a wireless device included in the communications path, if the propagation state of the communications path is rapidly changed, the update processing speed of the routing tables cannot catch up with this change, and thus may lead to failing to establish a communications path.

On the other hand, in the flooding method, each wireless device is characterized in that it has no information about a communications path. A wireless device receives data from another wireless device and continuously and unconditionally transmits the data on its own accord, and, by repeating this, the data finally is transmitted to a destination wireless device. Due to this, multiple wireless devices are simultaneously brought into a transmitting state in disorder.

As a result, radio traffic increases and radio waves are overcrowded, thus failing to maintain the quality of the communications path. Moreover, each wireless device is in a transmitting state over a long period of time so that power consumption of each wireless device is large. Especially, if the wireless device operates with a battery, it cannot last for a long time.

Patent Document 1: Japanese Patent Laid-Open Publication No. 2005-64721

Patent Document 2: Japanese Patent Laid-Open Publication No. 2008-66861

Non-Patent Document 1: "Sensor Network Technology", Shigeru Ando et. al., first issue, first edition, published in May 20, 2005, Tokyo Denki University Press Non-Patent Document 2: "ZigBee", Li Zheng, first issue, first edition, published in Feb. 22, 2006, RIC TELECOM Co., Ltd.

SUMMARY OF THE INVENTION

In view of the above, the present invention decreases the required capacity of a memory, reduces the required processing speed of a CPU, and reduces power consumption, in a wireless device while improving performance of a wireless mesh network system.

In accordance with a first aspect of the present invention, there is provided a wireless mesh network system which includes a plurality of wireless devices and is adapted to forward a message packet, wherein each of the wireless devices includes a transmitting unit, a receiving unit, a communications controller, and a RAM. Further, the communications controller controls such that an original source address contained in a message packet forwarded by a wireless device, which is an address of the wireless device that has firstly transmitted the message packet, and a packet number that identifies the message packet are stored in the RAM, and controls such that a message packet received is forwarded if information contained in the message packet received is not consistent with information of the original source address and the packet number stored in the RAM.

In accordance with a second aspect of the present invention, there is provided a wireless device having a transmitting unit, a receiving unit, a communications controller, and a RAM and being adapted to forward a message packet in a wireless mesh network system. In the wireless device, the communications controller controls such that an original source address contained in a message packet forwarded by the wireless device, which is an address of the wireless device that has firstly transmitted the message packet, and a packet number that identifies the message packet are stored in the RAM, and controls such that the message packet received is forwarded if information contained in the message packet received is not consistent with information of the original source address and the packet number stored in the RAM.

In accordance with a third aspect of the present invention, there is provided a control method of a wireless mesh network system, which includes a plurality of wireless devices and is adapted to forward a message packet, each of the wireless devices having a transmitting unit, a receiving unit, a communication controller, and a RAM. Further, the communications controller controls such that an original source address contained in a message packet forwarded by the wireless device, which is an address of the wireless device that has firstly transmitted the message packet, and a packet number that identifies the message packet are stored in the RAM, and controls such that a message packet received is forwarded if information contained in the message packet is not consistent with information of the original source address and the packet number stored in the RAM.

With the present invention, a wireless device stores an original source address and a packet number included in a transmitted message packet in a RAM and, thereafter, if a received message packet is information that has returned, the wireless device does not forward it. In this way, forwarding is conducted without executing a communications path search and without storing information on the communications path in the wireless device. Thus, the capacity of the RAM (memory) of each wireless device can be reduced, and the processing speed of a communications control unit (CPU) can be reduced. Further, power consumption of a wireless device can be reduced while the performance of a wireless mesh network system can be improved.

BRIEF DESCRIPTION OF THE DRAWINGS

The objects and features of the present invention will become apparent from the following description of particular embodiments, given in conjunction with the accompanying drawings, in which:

FIG. 3 is a view showing a packet structure;

FIG. 4 is a view showing structure of a control data region;

FIG. 6 is a flowchart showing a 'return check' process;

FIG. 7 is a view showing contents of a historical table of a wireless device;

FIG. 12 is a flowchart illustrating the proxy response.

DETAILED DESCRIPTION OF THE EMBODIMENTS

Hereinafter, embodiments of the present invention will be described in more detail with reference to accompanying drawings which forms a part hereof.

Figure 1:
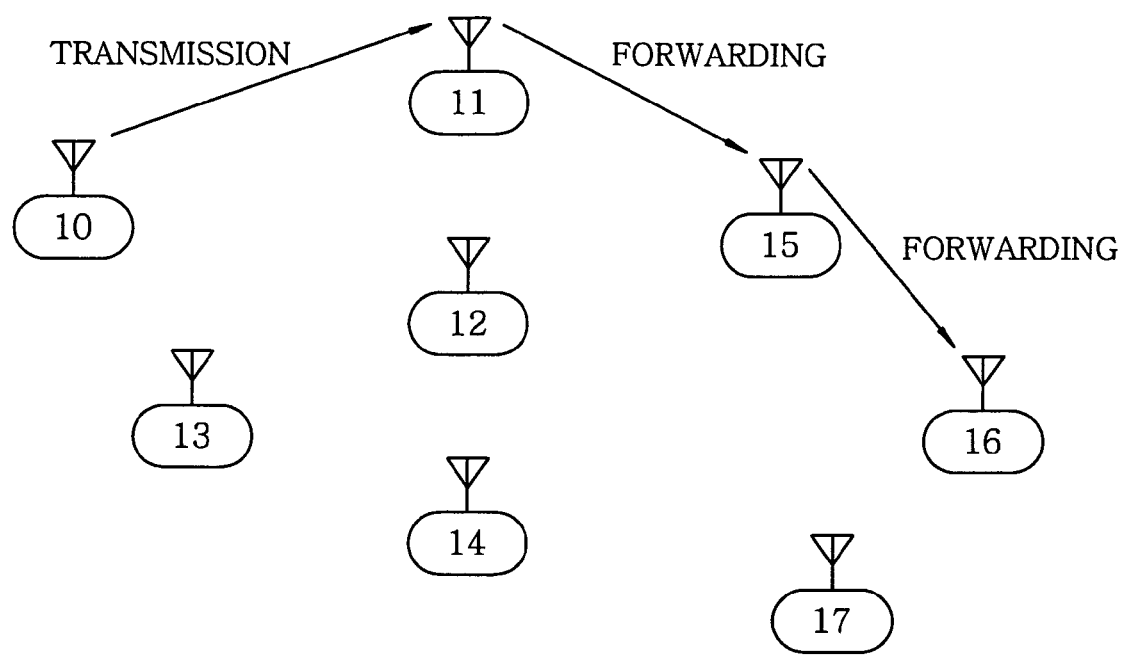
FIG. 1 is a view showing a concept of a wireless mesh network.

FIG. 1 is a view showing a concept of a wireless mesh network. The wireless mesh network includes wireless devices 10 to 17. Although it is illustrated that the number of wireless devices in the embodiment shown in FIG. 1 is 8, the number of wireless devices is not limited thereto. Further, although the wireless devices 10 to 17 having the same configuration will be described, each wireless device may have a different configuration as long as the present invention is applicable. Moreover, although each of the wireless devices 10 to 17 will be described as a mobile wireless device, a part or all of them may be at fixed positions.

A frequency band used in the wireless mesh network is, e.g., near 429 MHz, 1.2 GHz, and 2.4 GHz. In addition, transmission power of each of the wireless devices 10 to 17 is set to a specified low power of approximately 10 mW. Further, the communicable range of each of the wireless devices 10 to 17 is, e.g., from 200 m to 300 m.

Figure 2:
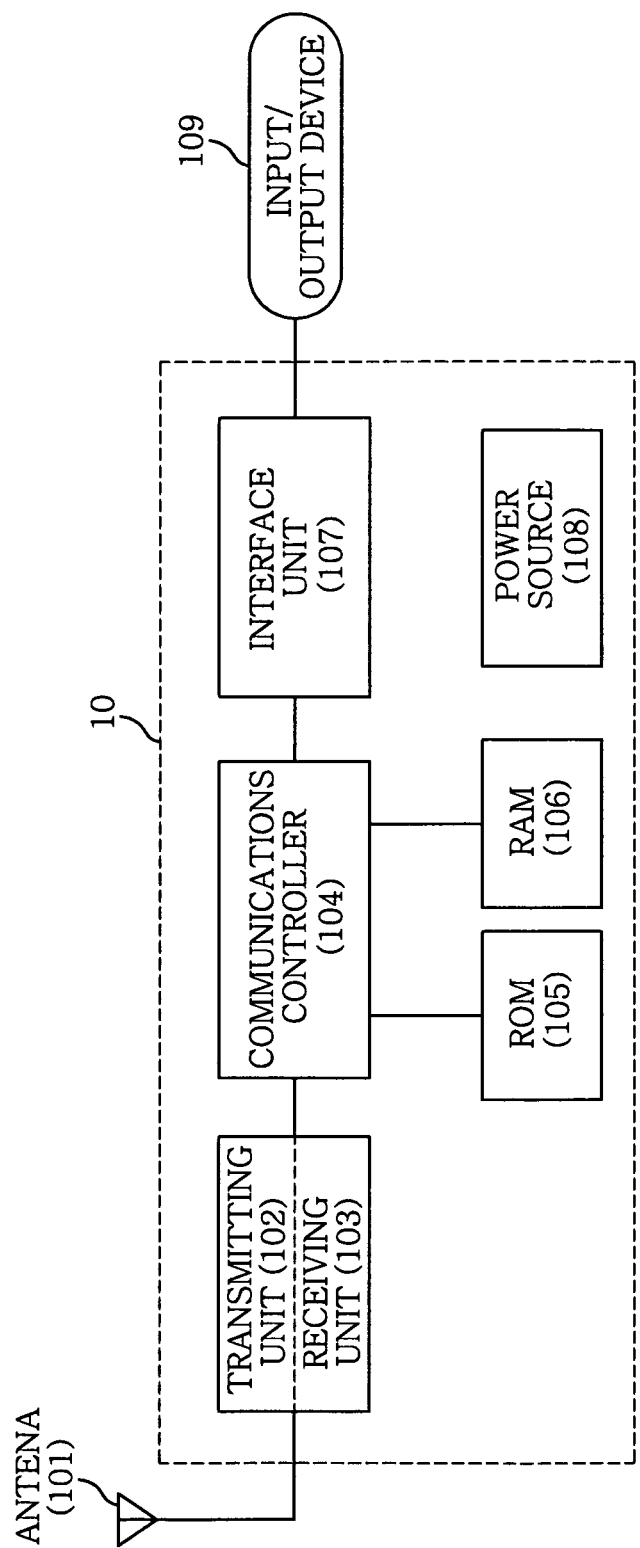
FIG. 2 is a block diagram of a wireless device.

FIG. 2 is a block diagram of the wireless device 10. The other wireless devices have the same configuration as that of the wireless device 10. In FIG. 2, a part enclosed by a broken line indicates the wireless device 10 and the wireless device 10 includes a transmitting unit 102, a receiving unit 103, and a communications controller 104. The wireless device 10 further includes a read only memory (ROM) 105, a random access memory (RAM) 106, an interface unit 107, and a power source 108. Also, an antenna 101 and an input/output device 109 which is mounted if necessary are provided outside the wireless device 10.

The transmitting unit 102 and the receiving unit 103 include one integrated circuit (IC), which in turn has a modulator, a power amplifier, a high-frequency amplifier, and a demodulator integrated therein.

The communications controller 104 includes a 16-bit central processing unit (CPU). The ROM 105 stores a control program for controlling the communications controller 104, and its capacity is 32 KB. The RAM 106 is a temporary storage region which is needed for program execution and also serves as a historical table for storing history information to be described later. The interface unit 107 employs start/stop synchronization serial communication (RS232C). The communications controller 104, the ROM 105, the RAM 106, and the interface unit 107 are mounted in one microcomputer.

An electric power from the power source 108 is supplied to the IC of the transmitting unit 102 and the receiving unit 103 and the microcomputer, and also supplied to the input/output device 109 which is connected if necessary. The power source 108 may be, e.g., a lithium ion battery or a dry cell battery. The input/output device 109 may include various sensors including a fire alarm device, automatic meters of gas, electricity, water or the like, or various actuators including a valve controller, an alarm transmitter, or the like. Besides, various input/output devices, such as a microphone, a headphone, and the like, are properly used depending on the intended use. In addition, in a wireless device provided in order to collect information from each wireless device at one place, e.g., a printer may be included as the input/output device.

The wireless mesh network of the embodiment does not adopt the routing method or the conventional flooding method but adopts various new technologies based on the conventional flooding method.

The basic new technologies include: (1) return check; (2) cooperative transmission; and (3) proxy response. Also, a combination of them may be used. Prior to describing these technologies, the structure (packet structure) of a message packet employed in the wireless mesh network of the embodiment will be described, and then, details of the technologies of (1) return check; (2) cooperative transmission; and (3) proxy response will be sequentially described below.

FIG. 3 is a view showing a packet structure of the embodiment. A preamble region includes 24 bytes or 34 bytes. For a synchronization region, 2 bytes are used. A length region is of 1 byte, and the length of data to be communicated (how many bytes the data is) is specified as 1 byte. In a source ID region, an identification number of the wireless device that has firstly sent this message packet is specified with 6 bytes. In a message region, contents of a message (data) to be communicated are specified in 46 bytes. In a cyclic redundancy check (CRC) region, a cyclic redundancy code is generated and stored for a portion from the length region to the message region except the preamble region and the synchronization region, such that there is checked whether the data is transmitted normally or not.

FIG. 4 is a view showing the structure of a control data region (see FIG. 3) including 9 bytes. A single byte consists of 8 bits. As shown in the uppermost row of FIG. 4, the least significant bit (LSB) which is firstly sent is labeled bit 0 and the most significant bit (MSB) which is lastly sent is labeled bit 7. The numbers 0 to 8 in the longitudinal direction of the leftmost column in FIG. 4 respectively indicate the bytes from the first byte that is firstly sent, which is labeled 0, to the ninth byte that is lastly sent, which is labeled 8.

The packet structure shown in FIG. 3 and the structure of the control data region shown in FIG. 4 are used for interactive communications among all of the wireless devices in the wireless mesh network of the embodiment shown in FIG. 1. That is, this packet structure is a common packet structure which is used for transmission from the wireless device 10 to the wireless device 11, forwarding from the wireless device 11 to the wireless device 15, and forwarding from the wireless device 15 to the wireless device 16, as shown in FIG. 1.

Referring to FIG. 4, the structure of the control data region will be described in more detail. The first byte labeled '0' in the leftmost column in FIG. 4 is a destination address. Here, the destination address refers to an address (ID address) unique to the wireless device 16 which is to receive data as shown in FIG. 1. In the embodiment, it is assumed that the wireless device 16 is in advance given 06H (hereinafter, H represents a hexadecimal expression) as an ID address. In addition, the destination address can be specified from 00H to FFH (0 to 255 in decimal).

An ID address given to each of the wireless devices 10 to 17 shown in FIG. 1 is unique to a corresponding wireless device. For example, the wireless device 10 is given ID address 00H, the wireless device 11 is given ID address 01H, and likewise, the other wireless devices are sequentially given individual ID addresses, and the wireless device 17 is given ID address 07H.

In the example shown in FIG. 1, a destination address 06H is written in the first byte of the control data region of the packet to be transmitted from the wireless device 10 to the wireless device 11, the first byte of the control data region of the packet to be forwarded from the wireless device 11 to the wireless device 15, and the first byte of the control data region of the packet to be forwarded from the wireless device 15 to the wireless device 16.

The second byte indicated as '1' in the leftmost column of FIG. 4 is a source address. Referring to FIG. 1, the ID address of the wireless device 10, the ID address of the wireless device 11, and the ID address of the wireless device 15 are written, as an individual source address, in the packet to be transmitted from the wireless device 10 to the wireless device 11, the packet to be forwarded from the wireless device 11 to the wireless device 15, and the packet to be forwarded from the wireless device 15 to the wireless device 16, respectively.

That is, 00H is written in the second byte of the packet to be transmitted from the wireless device 10 to the wireless device 11, 01H is written in the second byte of the packet to be forwarded from the wireless device 11 to the wireless device 15, and 05H is written in the second byte of the packet to be forwarded from the wireless device 15 to the wireless device 16. In addition, a source address can be specified from 00H to FEH (0 to 254 in decimal).

The $5^{th}$SB to MSB (bit 4 to bit 7) of the third byte indicated as '2' in the leftmost column of FIG. 4 represent the type of a packet. The types of packets are roughly classified as a packet that is data signals sent from a source or a packet that is acknowledgment signals (ACK signals) sent back to a source from a destination. In case a packet is a data signal, the type of the packet, e.g., sensor data, voice, or the like, is indicated in 4 bits.

The type of a packet is determined by referring to bit 4 through bit 7 of the third byte. In addition, the $4^{th}$SB (bit 3) of the third byte is used to indicate the content of an acknowledgement signal, wherein '0' indicates response permission and '1' indicates response rejection. In the $3^{rd}$SB (bit 2) of the third byte, '0' indicates text data transmission (TXT) and '1' indicates binary data transmission (TBN). And, the $2^{nd}$SB (bit 1) of the third byte is a reserve bit. Also, the LSB (bit 0) of the third byte represents the identification of a communications protocol. If the LSB of the third byte is '0', this indicates a packet communications mode (PK) that communicates by using a command control, and if it is '1', this indicates a headerless mode (HL) that is commandless communications.

The fourth byte labeled '3' in the leftmost column in FIG. 4 represents a packet number. The packet number is a number for identifying each packet. That is, the packet number indicates what number packet it is. In addition, the packet number can be specified from 00H to FFH (0 to 255 in decimal).

The fifth byte labeled '4' in the leftmost column in FIG. 4 indicates a valid data length. The valid data length is assigned with numbers 0 to 46, which indicates how many bytes are valid data in the 46 bytes of the message region shown in FIG. 3. In addition, the valid data length can be specified from 00H to 2EH (0 to 46 in decimal).

The sixth byte labeled '5' in the leftmost column in FIG. 4 is a frequency number. The frequency number is preliminarily assigned to each transmission frequency. Even when a plurality of transmission frequencies are selected in the wireless mesh network, it is possible to recognize which frequency is being used based on the frequency number. In addition, the frequency number is assigned from 02H to 52H (2 to 82 in decimal).

The seventh byte labeled '6' in the leftmost column in FIG. 4 is a region indicative of a remaining number of retransmission attempts and a number of forwarding attempts (Time To Live: TTL). The remaining number of retransmission attempts is obtained by subtracting the current number of retransmissions already attempted from a predetermined allowable maximum number of retransmission attempts, which indicates how many retransmission attempts are allowable from now on. Here, the maximum number of retransmission attempts indicates the allowable number of retransmission attempts of a message packet having the same 'packet number' from an original source wireless device to the same destination wireless device.

Further, information about whether or not the wireless device is the same wireless device is specified by the source address of the second byte and the destination address of the first byte of the control data region. Information about whether or not the retransmitted packet is the same message packet is specified by the fourth byte of the control data region.

The number of forwarding attempts (TTL) written in the region indicative of the number of forwarding attempts indicates how many forwarding attempts (limiting number) are allowable through wireless devices through which the corresponding message packet is transmitted from the source wireless device to the destination wireless device. In the example shown in FIG. 1, if a value of the number of forwarding attempts is, e.g., 5H, 4H is written in the region indicative of the number of forwarding attempts of the message packet forwarded from the wireless device 11 to the wireless device 15 and 3H is written in the region indicative of the number of forwarding attempts of the message packet forwarded from the wireless device 15 to the wireless device 16. When the number of forwarding attempts exceeds a predetermined value, the forwarding is stopped. In addition, the number of forwarding attempts is specified from 0H to FH (0 to 15 in decimal number system).

The eighth byte labeled '7' in the leftmost column in FIG. 4 includes reserve bits.

The ninth byte labeled '8' in the leftmost column in FIG. 4 is an original source address. Here, the original source address refers to the address of the wireless device that has first sent the message packet. Referring to FIG. 1, the same ID address OOH of the wireless device 10 is written in the packet transmitted from the wireless device 10 to the wireless device 11, the packet forwarded from the wireless device 11 to the wireless device 15, and the packet forwarded from the wireless device 15 to the wireless device 16. In addition, the original source address can be assigned from 00H to FEH (0 to 254 in decimal).

'Return check' will be described.

Prior to describing the 'return check', first, the conventional flooding method will be described. In the conventional flooding method, a wireless device (second wireless device) which receives data from another wireless device (first wireless device) unconditionally forwards (transmits) the received data. At this point, the wireless device receiving data from the first wireless device is not limited to the second wireless device, but may further include others.

In the same manner, a wireless device (third wireless device) which receives the data from the second wireless device unconditionally forwards the data. Likewise, the wireless device receiving data from the second wireless device is not limited to the third wireless device, but may further include others. In this way, the data is continuously transmitted, thereby enabling signal transmission beyond the communicable distance of a single wireless device.

In the above description, the less interference there is in data transmission, the shorter the distance between the transmitting first wireless device and the receiving second wireless device becomes. Thus, data can be forwarded in one direction from the first wireless device to the second wireless device.

However, if the first wireless device performs a receiving operation (such an operation state of a wireless device will be referred to as a reception mode in the following description) after finishing the transmission operation (such an operation state of a wireless device will be referred to as a transmission mode in the following description), there is a high likelihood that the first wireless device receives the data transmitted from the second wireless device that has operated in the reception mode just before. Especially, in case wireless devices having the same configuration, i.e., the wireless devices whose transmission power, reception sensitivity, and antenna gain are equal, are used in the wireless mesh network, even the propagation path of radio waves may be reversible, thus increasing the likelihood of reception.

As described above, the same wireless device can serve as the first wireless device and also as the third wireless device receiving data from the second wireless device. As a result, the data is transmitted from the first wireless device to the second wireless device and then to the first wireless device (third wireless device). Such a transmission of data from the second wireless device (reception side) to the first wireless device (transmission side) is referred to as a return. If returns occur, the same data may be repetitively transmitted and received multiple times between the first wireless device and the second wireless device.

Figure 5A:
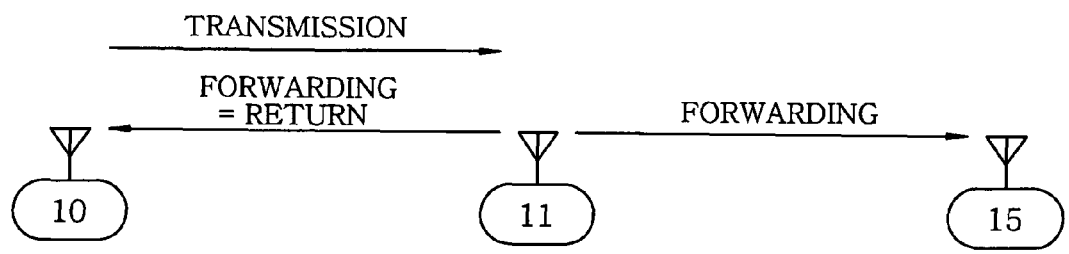
FIGS. 5A and 5B are views for explaining a return.
Figure 5B:
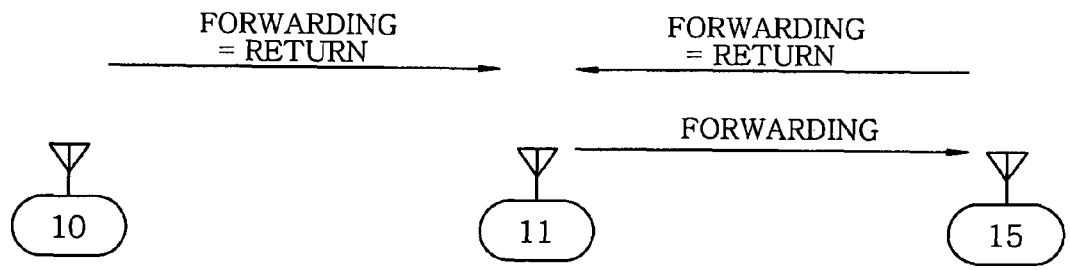

FIGS. 5A and 5B are views for explaining a return. In FIGS. 5A and 5B, the return in the wireless mesh network shown in FIG. 1 is described. As shown in FIG. 5A, data transmitted from the wireless device 10 (first wireless device) operating in the transmission mode is received by the wireless device 11 (second wireless device) operating in the reception mode and then forwarded (transmitted) from the wireless device 11 (second wireless device) operating in the transmission mode. The wireless device 10 (first wireless device) which has finished operating in the transmission mode and the wireless device 15 are all being operated in the reception mode. Thus, both of the wireless devices receive the data from the wireless device 11 (second wireless device). That is, there occurs a return from the wireless device 11 (second wireless device) to the wireless device 10 (first wireless device).

Next, the wireless device 10 (first wireless device) and the wireless device 15 which has finished operating in the reception mode are all operated in the transmission mode, and both of the wireless devices transmit the data received from the wireless device 11 (second wireless device). As a result, there occurs a return from the wireless device 10 (first wireless device) to the wireless device 11 (second wireless device), and there occurs a return from the wireless device 15 to the wireless device 11 (second wireless device).

In this way, returns can be repeated between the wireless device 10 (first wireless device) and the wireless device 11 (second wireless device) and between the wireless device 15 and the wireless device 11. In the case shown in FIG. 1, the separation distance between the wireless device 10 and the wireless device 15 is longer than the reaching distance of radio waves, so there will occur no return between the wireless device 10 and the wireless device 15.

Although FIG. 5 illustrates a relationship occurring only among three wireless devices, the same relationship occurs in all parts of the wireless mesh network. As a result, multiple unnecessary transmissions occur. In the aforementioned example, the communications purpose is achieved when data is transmitted from the wireless device 10 to the wireless device 16 and, thereafter, the emission of radio waves related to this data is unnecessary. However, with the conventional flooding method, even after data has reached the wireless device 16 from the wireless device 10, each wireless device continues to emit unnecessary radio waves in disorder until the number of forwarding attempts (TTL) reaches a prescribed value. 'Return check' is a technology that prevents such a situation.

FIG. 6 is a view showing in a flowchart the process of 'return check' performed in each wireless device. The 'return check' process is performed by the CPU serving as the communications controller 104. Prior to describing the flowchart shown in FIG. 6, 'history of message packet' (hereinafter, abbreviated to history), which is the content of the history table made in the RAM 106, will be described.

FIG. 7 is a view showing the contents of a history table of a wireless device. The RAM 106 of the wireless device is adapted to keep a part (history) of the contents of 9 bytes control data as a history table. The contents written in the history table are associated with a message packet received by the wireless device.

FIG. 7 shows the contents of the histories of message packets stored in the RAM 106. History 1, history 2, history 3, and history 4 are arranged in the order of reception by the wireless device. That is, a message packet labeled 'history 1' is received earliest, and then message packages associated with history 2, history 3, and history 4 are sequentially received by the wireless device. Each history is stored in the history table of the RAM 106 in a ring fashion. That is, after completion of a series of 'return check' processes, the history (referred to as history 5) received subsequent to history 4 will be overwritten over the history 1, which is the oldest history. Then, the history to be read can be specified by a pointer.

Here, the contents of the history table shown in FIG. 7 are information required to execute the flowchart shown in FIG. 6. It is determined whether to perform forwarding or not with reference to the contents of the history table shown in FIG. 7. Here, the capacity of histories 1 to 4 is 4×4 bytes=16 bytes. Therefore, the capacity of the RAM 106 for the establishment of a communications path is preferably 16 bytes at minimum. Like this, the capacity for the establishment of a communications path is small compared to the capacity of 400 bytes to 3 kilobytes required for the routing method.

The contents stored in each of the histories 1 to 4 include 'original source address', 'packet type', 'packet number', and 'remaining number of retransmission attempts'. These four are collectively called 'RECVINFO variables'.

The flowchart shown in FIG. 6 will be described.

First, in step ST100, the communications controller 104 recognizes the reception of a message packet to be received (one message packet newly received).

More specifically, each time the receiving unit 103 receives a message packet, the contents of 9 bytes control data are forwarded to the communications controller 104, and the communications controller 104 recognizes the reception.

In step ST101, the communications controller 104 determines whether or not the original source of the received message packet is identical to the wireless device (referred to 'corresponding wireless device' hereinafter) it belongs to.

That is, the communications controller 104 acquires the original source address by decoding the contents of the ninth byte of the control data. The communications controller 104 keeps the ID address preliminarily assigned to the corresponding wireless device and compares the acquired original source address with its own ID address. If the ID address matches with the acquired original source address (if Yes), it is determined that the original source is the corresponding wireless device, and if the ID address does not match with the acquired original source address (if No), it is determined that the original source is not the corresponding wireless device.

If the result of determination in step ST101 is Yes, the process moves to step ST108, and if the result of determination in step ST101 is No, the process proceeds to step ST102.

If the original source is the corresponding wireless device, the received packet is the packet that is originally transmitted by the corresponding wireless device and then received and transmitted by another wireless device. Therefore, such packet is not a subject to be processed after step ST102. Thus, the process of step ST101 is provided to cope with this situation.

In step ST108, the communications controller 104 discards the received packet.

Here, the discarding of the received packet means that, as a result of determination in step ST101 is Yes, the message packet is not forwarded. After the processing in step ST108, a series of return check processes is finished.

In step ST102, the communications controller 104 reads out a previously received history.

In this case, in a loop including steps ST103, ST104, and ST106, the history to be firstly read is history 4 shown in FIG. 7. In addition, if the number of history to be read is set only to 1, the processes of steps ST104 and ST106 are not needed.

In step ST103, the communications controller 104 compares the content of history 4 previously received with the content of data (history 5) contained in a current message packet. The contents for comparison include three: 'original source address'; 'packet type'; and 'packet number'. Comparison is made as to whether history 4 and history 5 are consistent with each other in these three contents. If 'packet type' is all the same, there are compared two contents: 'original source address'; and 'packet number'.

The following description will be made with respect to a case where there are three contents for comparison. If the content of the data (history 5) contained in the message packet received and the content of history 4 are identical in the three contents, a determination is made as Yes in step ST103. And if otherwise, i.e., if the content of the data (history 5) contained in the message packet received and the content of history 4 are not identical, a determination is made as No.

If the result of determination in step ST103 is Yes, the process goes to step ST107, and if the result of determination in step ST103 is No, the process proceeds to step ST104.

In step ST107, the communications controller 104 also determines whether or not the content of 'remaining number of retransmission attempts' of the data (history 5) contained in the message packet received and the content of 'remaining number of retransmission attempts' of history 4 match with each other.

If the content of 'remaining number of retransmission attempts' of the data (history 5) contained in the message packet received and the content of 'remaining number of retransmission attempts' of history 4 match with each other, a determination is made as Yes. And, if the content of 'remaining number of retransmission attempts' of the data (history 5) contained in the message packet received and the content of 'remaining number of retransmission attempts' of history 4 do not match with each other, a determination is made as No.

If the result of determination in step ST107 is Yes, this means 'return'. Therefore, the process moves to step ST108, and the wireless device finishes a series of processes without further transmission. If the result of determination in step S107 is No, the process moves to step ST104.

In step ST104, the communications controller 104 determines whether or not the data (history 5) contained in the message packet received have been compared with the contents of all the histories of the history table. That is, it is determined whether or not four times of comparisons are made between the content of history 5 and the content of history 4, between the content of history 5 and the content of history 3, between the content of history 5 and the content of history 2, and between the content of history 5 and the content of history 1.

If it is determined that the comparisons between the content of the data (history 5) contained in the message packet received and the contents of four histories are finished, a determination is made as Yes. And, if it is determined that the comparisons are not finished, a determination is made as No.

If the result of determination in step ST104 is Yes, the process proceeds to step ST105 without further history comparison. If the result of determination in step ST104 is No, the process goes to step ST106.

In step ST106, the communications controller 104 reads out a history that has not been compared with data (history 5) contained in the message packet received. That is, in case only the comparison between history 5 and history 4 is finished, history 3 which has not been compared is read out and the process goes back to the step ST103.

As the process of step ST103 is included in the loop, it is repeated multiple times. In case the comparisons between history 5 and history 4 and between history 5 and history 3 are finished, history 2 which has not been compared is read out and the process proceeds back to step ST103. Likewise, in case the comparisons between history 5 and history 4, between history 5 and history 3, and between history 5 and history 2 are finished, history 1 which has not been compared is read out and the process goes back to step ST103.

In step ST105, the communications controller 104 forwards the message packet received (message packet associated with history 5).

Thus, the return process is finished. In addition, immediately before completion of a series of 'return check' processes, history 5 is overwritten on the region currently storing history 1 in a ring-type memory.

The above-described return process can be summarized as follows. If data (history 5) contained in a message packet received is not identical to one of histories 1, 2, 3, and 4 in all of 'original source address', 'packet number', and 'packet type' stored in histories 4 to 1 of the RAM 106 with respect for each transmissions (in other words, at least one of histories 4 to 1 is not consistent with history in at least one of 'original source address', 'packet number', and 'packet type' when comparing each of the histories 4 to 1 with history 5), control is made so as to forward the message packet received.

In addition, if it is known beforehand that there is one packet type, there is no need to determine about 'packet type'. In case there is not made a determination about 'packet type', when the data (history 5) contained in the message packet received is not consistent with the histories 4 to 1 stored in the RAM 106 in 'original source address' and 'packet number' (in other words, at least one of histories 4 to 1 is not consistent with history 5 in at least one of 'original source address' and 'packet number' when comparing the histories 4 to 1 with history 5 in 'original source address' and 'packet number'), control is made so as to forward the message packet received.

Also, the 'remaining number of retransmission attempts' may be stored in the RAM, for each of the plural transmissions performed by the wireless device. When storing such a 'remaining number of retransmission attempts' in the RAM, the following process is performed (an illustration of the flowchart will be omitted).

First, the 'original source addresses', the 'packet numbers', and the 'remaining numbers of retransmission attempts' of the histories 4 to 1 stored in the RAM are compared with the 'original source address', the 'packet number', and the 'remaining number of retransmission attempts' of the data (history 5) contained in the message packet.

If all of the 'original source address', the 'packet number', and the 'remaining number of retransmission attempts', for each of the plural times of forwarding attempts recorded in histories 4 to 1 are consistent with those of the data (history 5) contained in the message packet received, control is made so as not to forward the message packet received.

On the other hand, if at least one of the 'original source address', the 'packet number', and the 'remaining number of retransmission attempts', for each of the plural times of forwarding attempts stored in the RAM is not consistent with those of the data (history 5) contained in the message packet received (unless at least one of histories 4 to 1 are consistent with history 5 in the aforementioned three contents when comparing histories 4 to 1 with history 5), control is made so as to forward the message packet received.

As described above, with the addition of determination about 'remaining number of retransmission attempts', the efficiency of forwarding can be further increased. Further, as for the contents for comparison between the histories 4 to 1 and history 5, 'packet type' may be added to the three contents of 'original source address', 'packet number', and 'remaining number of retransmission attempts'.

Here, the number of histories which are compared with the data contained in the message packet received is not limited to 4, but may be properly selected based on the scale of the wireless mesh network, for example, the number of histories to be compared may be 1.

The following effects are attained by applying the above-described 'return check' to the conventional flooding method.

First, since the communications controller performs a process for determining whether or not the original source is a corresponding wireless device (the process of step ST101), it is possible to prevent a return between the wireless device (original source wireless device) that firstly transmitted and the wireless device that has secondly transmitted.

Next, since 'original source address' and 'packet number' ('packet type' may be added thereto) of the received message packet are compared with histories stored in the memory of the wireless device receiving the message packet (process from step ST102 to step ST108), it is possible to prevent the same message packet returned through other wireless devices from being transmitted from the same wireless device (other wireless device than the original source wireless device). Additionally, with the processes of comparison with a plurality of histories (process of steps ST103, ST104, and ST106), it can be known whether or not a currently received message packet is a message packet that has 'returned' by making a comparison between at least the latest message packets and the currently received message packet. By such a process of 'return check', the occurrence of returns can be effectively prevented.

As described above, if the return process of the embodiment is employed in the flooding method, the occurrence of unnecessary returning radio waves in the wireless mesh network can be prevented. As a result, the noise level in the wireless mesh network can be lowered, and the reaching distance of radio waves between wireless devices can be effectively increased, thus improving the quality of a communications path. Also, in each wireless device, waste of time spent on transmission can be reduced.

Thus, in case an unrechargeable battery is used for a power source of the wireless device, its wasteful consumption is prevented, and in case a rechargeable battery is used therefor, usage time can be lengthened without charging the battery. Further, the lower capacity of a RAM can be used compared to the conventional routing method.

'Cooperative forwarding' will be described.

Cooperative forwarding is a method in which when there is a plurality of wireless devices in a communicable area in a wireless mesh network, the time for carrier sense is changed by cooperation between the wireless devices and simultaneous forwarding from the wireless devices can be prevented. Cooperative forwarding is based on random wait and carrier sense technologies.

Figure 8:
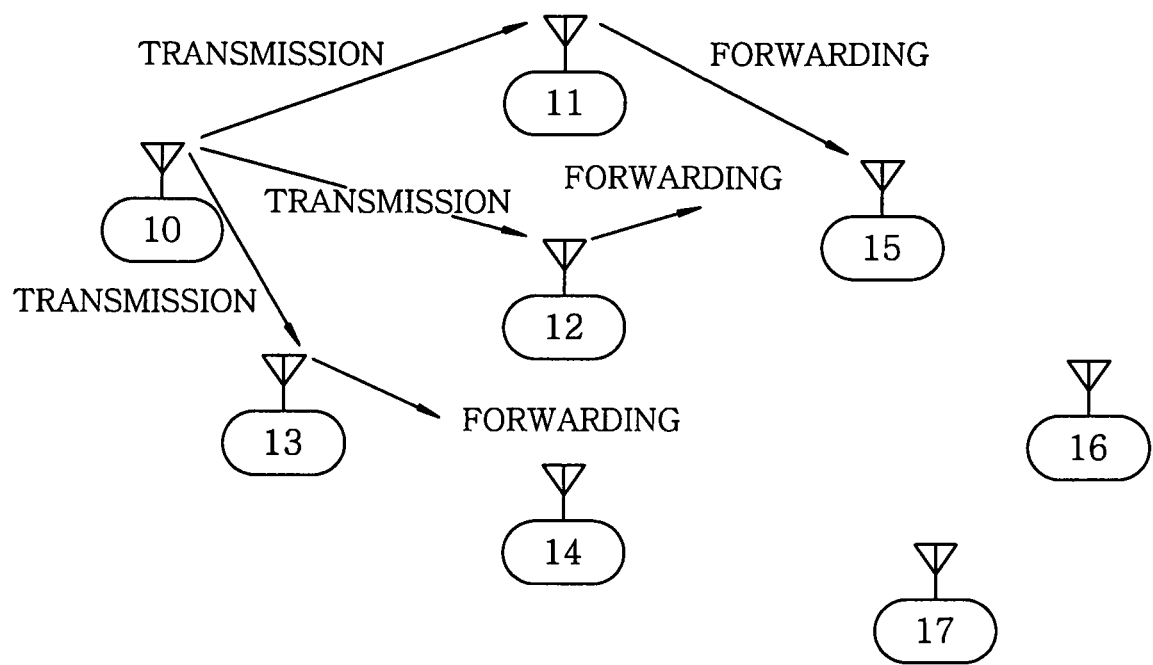
FIG. 8 is a view showing a wireless mesh network employing cooperative forwarding.
Figure 9:
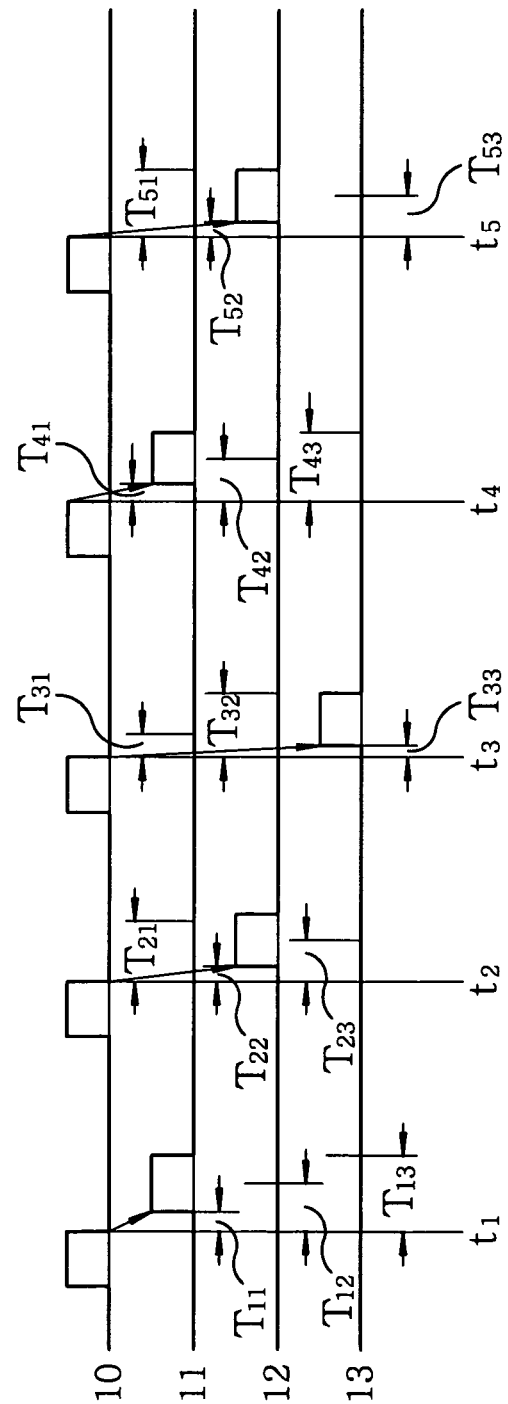
FIG. 9 is a view showing a transmission state of each wireless device in the cooperative forwarding.

FIG. 8 is a view showing one example of a wireless mesh network employing cooperative forwarding. FIG. 9 is a view showing a transmission state of each wireless device in cooperative forwarding. Referring to FIGS. 8 and 9, cooperative forwarding will be described. As shown in FIG. 8, the cooperative forwarding is a technology that is effective when radio waves from the wireless device 10 can be received by a plurality of wireless devices. The following description will be given with respect to a case where three wireless devices including a wireless device 11, a wireless device 12, and a wireless device 13 can receive radio waves from the wireless device 10.

In FIG. 9, the lapse of time from a reference time needed for each of the wireless devices 10 to 13 to change from a low level to a high level on the vertical axis is a carrier sense time. Here, the high level corresponds to a transmission state and the low level corresponds to a reception state. A wireless device in the transmission state is indicated by the front part of an arrow in FIG. 9. The horizontal axis in FIG. 9 is a time axis.

In the 'Carrier sense' technology, a wireless device waits for a predetermined time (carrier sense time) from a starting point of time (carrier sense start time) and if the wireless device recognizes that there is no transmission (forwarding) from another wireless device during the predetermined time, it initiates a transmission by itself. Further, if the wireless device recognizes a transmission (forwarding) from another wireless device during the predetermined time, it does not initiate the transmission. Here, the carrier sense time may be expressed by the following Eq. (1):

$$\text{Carrier sense time} = \text{random waiting time} + \text{correction value} \quad \text{Eq. (1)}$$

where the random waiting time is set to a random value in a range of 0 to 2 ms, which is 2 ms at maximum. And, the correction value in Eq. (1) may be defined as Eq. (2):

$$\text{Correction value} = \text{value of RANDOM\_ADJ variable} \times \text{coefficient} \quad \text{Eq. (2)}$$

where the value of RANDOM_ADJ variable is set to one of values of 0, 1, 2, 3, 4, and 5, and the value of coefficient is 3 ms. Further, the carrier sense start times are transmission completion times (in FIG. 9, time $t_1$, time $t_2$, time $t_3$, time $t_4$, and time $t_5$) of the wireless device 10 (see FIG. 9).

As shown in FIG. 9, the carrier sense time of the wireless device 11 is $T_{11}$, the carrier sense time of the wireless device 12 is $T_{12}$, and the carrier sense time of the wireless device 13 is $T_{13}$, based on time $t_1$. In this way, the carrier sense times of the wireless devices are in principle different from each other. To make the carrier sense times in an initial state different from each other, for example, a random number is generated by each communications controller at the time of power input to each wireless device. Then, a random waiting time for each wireless device is set depending on the random number, thereby setting a carrier sense time for each wireless device.

Referring to FIG. 9, the process of cooperative forwarding will be sequentially described. The description will be made with respect to a case where the original source wireless device is the wireless device 10 which sequentially transmits message packets (see the uppermost part of FIG. 9). Further, the description will be made with respect to a case where each of the wireless devices 11 to 13 is capable of receiving radio waves from other wireless devices than itself which is included in the wireless devices 11 to 13.

The wireless device 10 finishes a transmission at time $t_1$. At this point, the carrier sense time of the wireless device 11 is $T_{11}$, the carrier sense time of the wireless device 12 is $T_{12}$, and the carrier sense time of the wireless device 13 is $T_{13}$. Having a relation given as time $T_{11}$<time $T_{12}$<time $T_{13}$, the wireless device 11 initiates forwarding. The wireless device 12 and the wireless device 13, whose carrier sense times are longer than that of the wireless device 11, recognize that the wireless device 11 has initiated forwarding and wait for a forwarding operation.

When the wireless device 11 has finished the forwarding and changes the value of RANDOM_ADJ variable, the carrier sense time thereof is set to $T_{21}$. Time $T_{21}$ is longer than time $T_{11}$. For example, the value of RANDOM_ADJ variable is set to a maximum value of 5. On the other hand, the carrier sense times of the other wireless devices 12 and 13, which have not performed forwarding, are set to be shorter than the carrier sense times that have been set before. For example, the value of RANDOM_ADJ variable is decreased by 1 so that their carrier sense times are set to be shorter than the carrier sense times set before, by one step. The carrier sense time of the wireless device 12 is set to $T_{22}$, and the carrier sense time of the wireless device 13 is set to $T_{23}$.

Next, the wireless device 10 finishes the transmission at time t2. At this point, the carrier sense time of the wireless device 11 is $T_{21}$, the carrier sense time of the wireless device 12 is $T_{22}$, and the carrier sense time of the wireless device 13 is $T_{23}$. That is, having the relation given as time $T_{22}$<time $T_{23}$<time $T_{21}$, the wireless device initiates forwarding. The wireless device 11 and the wireless device 13 whose carrier sense times are longer than that of the wireless device 12 recognize that the wireless device 12 has initiated forwarding and wait for a forwarding operation.

When the wireless device 12 finishes the forwarding, the carrier sense time thereof is set to time $T_{32}$. Time $T_{32}$ is a period of time when the value of RANDOM_ADJ variable is set to a maximum value of 5. On the other hand, the carrier sense times of the other wireless devices which have not performed forwarding are decreased by one level. Thus, the carrier sense time of the wireless device 11 is set to $T_{31}$, and the carrier sense time of the wireless device 13 is set to $T_{33}$.

Thereafter, the above procedure is repeated to perform forwarding in sequence as shown in FIG. 9. Although the above description is made with respect to an example of forwarding at a first stage from the original source, such cooperative forwarding is performed in all places of the wireless mesh network. In this way, cooperative forwarding is characterized in that all the wireless devices within a communications coverage (range where a plurality of wireless devices can receive radio waves from one another), except the wireless device serving as the original source, change their carrier sense times in cooperation with one another.

That is, the process of the above-described cooperative forwarding is summarized as follows. The reception completion time of a received message packet is detected by a wireless device. When that wireless device had performed forwarding right before it received the message packet, the carrier sense time thereof that is a length of the time from the reception completion time to the initiation of forwarding is changed such that it becomes longer than the carrier sense time set before.

On the other hand, if the wireless devices had not performed forwarding right before it received the message packet, the carrier sense time thereof is set to be shorter than the carrier sense time set before. Here, the carrier sense time may be set to a maximum value within an allowable range when making it longer and may be decreased by one level when making it shorter, if a stepwise change of set values is possible.

In such cooperative forwarding, if one wireless device initiates forwarding, the other wireless devices wait for forwarding. Thus, since it is one wireless device that performs forwarding, it can be prevented to emit radio waves from a plurality of wireless devices to thereby cause the congestion of communications traffic. As a result, the quality of a communications path is improved.

Further, as the other wireless devices hold back forwarding, the consumption of the batteries of the other wireless devices can be avoided and the time to battery replacement can be extended. Moreover, in case a plurality of communications paths can be configured from the original source to the destination by selecting one of the wireless devices, since equal opportunity for transmission is provided without being focused on a certain wireless device, the power consumption and the time to battery replacement can be nearly equalized.

As described above, randomly setting carrier sense times at an initial stage itself may not be enough to avoid the probability that initial carrier sense times overlap and the state of simultaneous forwarding is fixed. Therefore, 'random wait' is further supplemented in order to make variations in the carrier sense time of each wireless device. Hereinafter, 'random wait' will be described in more detail.

The setting of random wait time is associated with the coefficient value of Eq. (2). Both the random wait time and the coefficient value need to be properly set depending on the performance of the wireless device. When the coefficient value is 3 ms as mentioned above and the value of the RANDOM_ADJ variable of each wireless device is one of 0, 1, 2, 3, 4, and 5, each correction value expressed by Eq. (2) is 0 ms, 3 ms, 6 ms, 9 ms, 12 ms, and 15 ms. Meanwhile, the random wait time varies depending on the random number generated by every wireless device.

For example, when the maximum value of the random wait time is set to 2 ms, the carrier sense time of each wireless device falls within the ranges of 0 ms to 2 ms (0 ms+2 ms), 3 ms to 5 ms (3 ms+2 ms), 6 ms to 8 ms (6 ms+2 ms), 9 ms to 11 ms (9 ms+2 ms), 12 ms to 14 ms (12 ms+2 ms), and 15 ms to 17 ms (15 ms+2 ms) by adding the random wait time (0 ms to 2 ms) to the aforementioned correction value as shown in Eq. (1).

As described above, the carrier sense times of the wireless devices are spaced apart from one another by the time interval of 1 ms or more, so they do not overlap. By setting the maximum value of the random wait time in this manner, the carrier sense times of respective wireless devices can be made not to overlap and it can be determined whether or not other wireless devices have initiated forwarding during a time period of at least 1 ms.

That is, the time interval of 1 ms are set on the premise that a wireless device has the performance capable of detecting the initiation of transmission of other wireless devices within a processing time of 1 ms. The time length of 1 ms corresponds to a value of coefficient—(maximum value of random wait time). Therefore, if a wireless device has the performance capable of determining about the transmission of other wireless devices) more quickly, the maximum value of the random wait time may be set to a value greater than 2 ms. Accordingly, the distribution of the random wait times of the wireless devices can be broadened and the likelihood of forwarding the same data from the wireless devices in a redundant manner can be reduced.

Further, from the viewpoint of forwarding rate in the wireless mesh network system, it can be thought as follows. If the process of carrier sense of this embodiment is appropriate, it is often the case that the wireless device whose RANDOM_ADJ variable is 0 performs a forwarding operation. In this case, the carrier sense time equals the random wait time. Accordingly, if the maximum value of the random wait time is set to a value smaller than, e.g., the random wait time of 2 ms in accordance with the embodiment within a range that the performance of the wireless device permits, the forwarding rate of the wireless mesh network system can be increased.

In the cooperative forwarding, carrier sense times may be set by giving priorities based on packet type. For example, in case an acknowledgement signal (ACK signal) is returned to the original source from a wireless device in the forwarding path, the wireless device which has received the acknowledgement signal may immediately forward with the highest priority without carrier sensing. Also, priorities may be given in a manner that the first priority is given to the transmission of the acknowledgement signal, the second priority is given to the forwarding of the acknowledgement signal, the third priority is given to message forwarding, and the lowest priority is given to message transmission.

Next, 'Proxy response' will be described.

A proxy response is a communications method that is advantageous in a case of employing a method wherein, if a reception is acknowledged by an acknowledgement signal (ACK signal), the next message packet is transmitted, and, if the reception thereof is not acknowledged, the same message packet as sent before is retransmitted. The proxy response does not refer to sequentially transmitting acknowledgement signals returned from the destination wireless device to the original source without interruption, but refers to allowing another wireless device to return an acknowledgement signal on behalf of the destination wireless device.

The proxy response will be described more specifically. It is assumed that the forwarding of the previous acknowledgment signal is stopped. In this case, the original source transmits a retransmission message packet. When the wireless device (another wireless device) which has previously received the acknowledgement signal receives the retransmission message packet from the original source, the wireless device transmits the acknowledgment signal to the original source on behalf of the destination wireless device. This is called a proxy response.

Here, the retransmission message packet refers to a message packet which re-transmits the same message transmitted from the original source if the acknowledgement signal is not returned to the original source.

The following description will be given about in which timing the retransmission message packet is to be issued. In the wireless mesh network, a wireless device cannot recognize how many hops the other party is away from it. Due to this, the original source wireless device is configured such that it predicts a period of time required for a message packet to reach the final destination wireless device (abbreviated to destination wireless device) and for an acknowledgment signal to get back. The original source wireless device checks whether or not there is the acknowledgment signal from the destination wireless device during that period of time, and, if not, sends a retransmission message packet after a time slightly longer than the period of time.

In a basic communications method, if it is determined that a response of the acknowledgment signal does not get back within the above period of time, the original source wireless device re-transmits the retransmission message packet to the destination wireless device.

However, in case such a communications method is employed, two types of message packets, i.e., an acknowledgment signal and a data signal may collide with each other on the communications path. Then, the acknowledgment signal cannot be returned to the original source within a predetermined period of time. Actually, the acknowledgment signal is getting back, but the original source does not recognize this and re-transmits a retransmission message packet to the destination wireless device.

In the conventional method, after acquiring an acknowledgement signal about this retransmission message packet, the next message packet is transmitted. Therefore, the time until transmitting the next message packet tends to become longer. That is, the forwarding rate becomes lower (slower).

Figure 10:
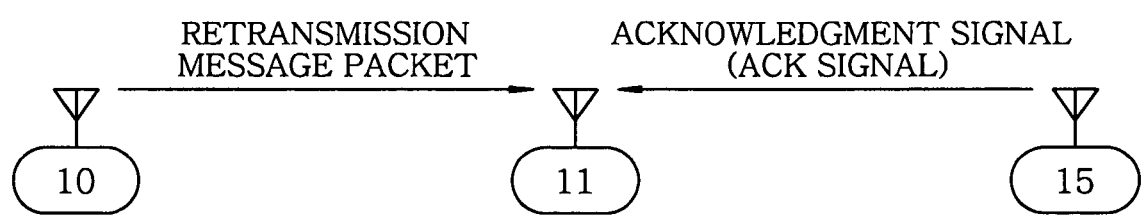
FIG. 10 is a view schematically showing a collision between a retransmission message packet from the original source and an acknowledgment signal.

FIG. 10 is a view schematically showing a collision between a retransmission message packet, which is a message packet re-transmitted from the original source wireless device 10, and an acknowledgment signal from the wireless device 15. The wireless device 11 cannot perform transmission and reception simultaneously. As a result, in a transmission state of an acknowledgment signal (the wireless device 11 is in an operating state of transmission), the wireless device 11 cannot receive the retransmission message packet and the communications path of a retransmission message packet is blocked. Also, in a transmission state of a retransmission message packet (the wireless device 11 is in an operating state of transmission), the wireless device 11 cannot receive the acknowledgment signal and the communications path of an acknowledgment signal is blocked. Such a disadvantage is overcome by 'proxy response'.

Figure 11:
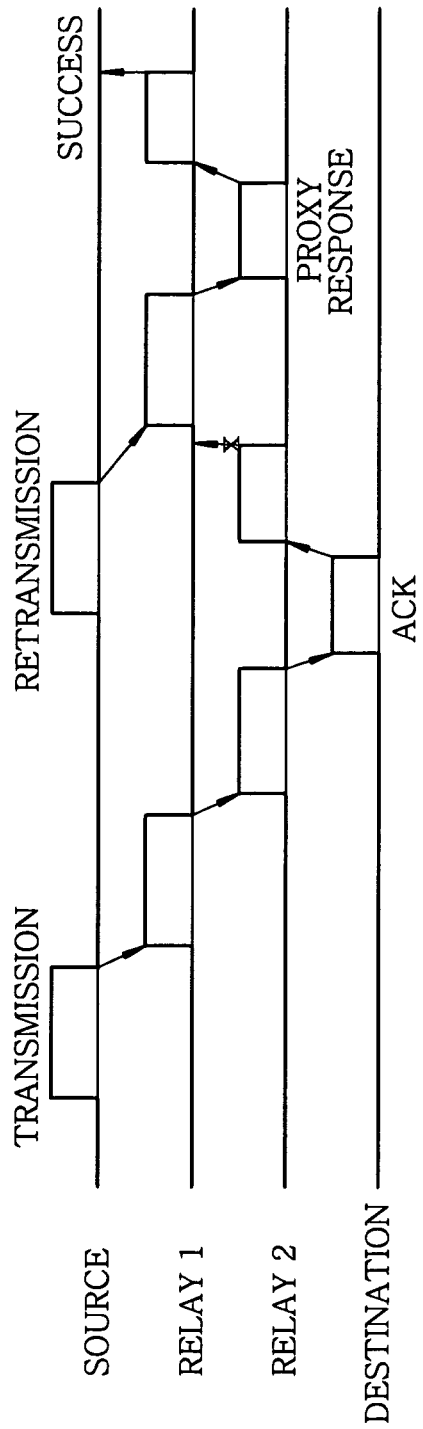
FIG. 11 is a view showing a concept of a proxy response.

FIG. 11 is a view showing concept of the proxy response. Referring to FIG. 11, the proxy response will be described. FIG. 11 illustrates an example in which a message packet is transmitted from the original source wireless device (marked as sourced in FIG. 11) to the destination wireless device (marked as destination in FIG. 11) via a first relay wireless device (marked as relay 1 in FIG. 11) and a second relay wireless device (marked as relay 2 in FIG. 11). The horizontal axis of FIG. 11 indicates a time axis.

A message packet is transmitted from the source to the destination via relays 1 and 2. Then, the destination performs checking on a cyclic redundancy check region (see FIG. 3), and if it is determined that the message packet has been received normally without error, the destination sends back an acknowledgment signal. Although the acknowledgment signal is sent from the relay 2 to the relay 1, the relay 1 cannot receive the acknowledgment signal sent from the relay 2 because the relay 1 is already in a reception state of a retransmission message packet.

As a result, the acknowledgment signal (ACK signal) is not forwarded to the source. Meanwhile, the source has not received the acknowledgment signal even after a predetermined time and transmits a retransmission message packet. Then, the retransmission message packet is sent to the relay 2 from the relay 1. In the conventional method, the retransmission message packet is sent to the destination from the relay 2 by a typical route in such a case. However, in case when 'proxy response' is employed, because the relay 2 is already receiving the acknowledgment signal about the message packet on which the retransmission message packet is based, the relay 2 does not send the retransmission message packet to the destination but sends the acknowledgment signal to the source via the relay 1.

FIG. 12 is a view showing the flowchart of a proxy response. Referring to FIG. 12, the process of the proxy response will be described. In processes of the flowchart shown in FIG. 12, a similar history table to that shown in FIG. 7 used in the return processes is also used. But, unlike the history table shown in FIG. 7, this table stores only the histories of a case where a message packet corresponds to an acknowledgment signal (ACK signal).

Although a message packet serving as a subject of a history in the return process is different from a message packet serving as a subject of a history in the proxy response process, the same term 'history' is used. Further, the history table is configured to store three histories of an acknowledgment signal. Further, the contents to be stored include three: 'original source address', 'destination address', and 'packet number'. Accordingly, 9 bytes of the capacity of the RAM 106 are required in order to store three histories.

In step ST200, the communications controller 104 recognizes that a message packet is received.

More specifically, each time the receiving unit 103 receives a message packet, the contents of 9 bytes control data are forwarded to the communications controller 104, so the communications controller 104 recognizes the arrival of the message packet.

In step ST201, the communications controller 104 determines whether the message packet is a data signal or not. That is, the communications controller 104 checks whether the message packet is an acknowledgment signal (ACK signal) or a data signal by identifying the packet type of the third byte of control data.

If the message packet is a data signal, it is determined as Yes, and if the message packet is not a data signal (i.e., the message packet is an acknowledgment signal (ACK signal)), it is determined as No. If the result of determination in step ST201 is Yes, the process proceeds to step ST202, and if the result of determination in step ST201 is No, the process goes to step ST207.

In step ST207, the communications controller 104 writes 'original source address', 'destination address', and 'packet number' of the acknowledgment signal (ACK signal) in the history table of a ring-type memory, and then finishes the process.

In step ST202, the communications controller 104 reads out one from the histories of previously received acknowledgement signals. In this embodiment, in a loop including steps ST203, ST204, and ST206, it is assumed that the number of histories stored is 3 and the history read out firstly is history 3.

In step ST203, the communications controller 104 compares the contents of history 3 previously received with the contents of a message packet currently received. The contents for comparison are 'original source address', 'destination address', and 'packet number'. Comparison is made as to whether the contents of history 3 and the contents of the message packet are consistent with each other in these three contents.

If the contents of history 3 and the contents of the message packet are consistent with each other in these three contents, a determination is made as Yes, and if not, a determination is made as No.

If the result of determination in step ST203 is Yes, the process moves to step ST205, which means that the 'original source address', 'destination address', and 'packet number' of the message packet received are consistent with those of the past history. Thus, it can be confirmed that the received message packet is a retransmission message.

If the result of determination in step ST203 is No, the process goes to step ST204.

In step ST204, the communications controller 104 determines whether or not every comparison has been made between the contents of history 3, the contents of history 2, and the contents of history 1 and the contents of the message packet received. If it is determined that the comparisons between the contents of the received message and the contents of all three histories are finished, a determination is made as Yes. If not, a determination is made as No.

If the result of determination in step ST204 is Yes, the process is finished without further history comparison. If the result of determination in step ST204 is No, the process moves to step ST206.

In step ST206, the communications controller 104 reads out a history that has not been compared with the received message packet. For example, in case only the comparison with history 3 is finished, history 2 which has not been compared is read out and the process returns back to step ST203. In case the comparisons with history 3 and history 2 are finished, history 1, which has not been compared, is read out, and the process returns back to step ST203.

In step ST205, the communications controller 104 forwards an acknowledgment signal (ACK signal) to the original source. Thereafter, the process is finished.

That is, the above-stated proxy response process will be summarized as follows. If the message packet received by a wireless device is an acknowledgment signal, control is made such that the 'original source address', 'destination address', and 'packet number' contained in the acknowledgment signal are stored in the RAM. If the message packet received is a data signal, control is made such that an acknowledgment signal is transmitted to the source wireless device when the data contained in the message packet received is consistent with contents of the original source address, the destination address, and the packet number contained in the acknowledgment signal stored in the RAM.

Here, the number of histories stored in the RAM is not limited to 3, but may be properly selected based on the scale of the wireless mesh network, e.g., the number of histories to be compared may be 1.

With this proxy response technology, unnecessary forwarding to send a retransmission message packet to the destination can be prevented. Accordingly, there is no need to radiate unnecessary radio waves, so the quality of the communications path can be improved.

In such a communications method, when the source transmits a message packet, the source transmits the next message packet after receiving an acknowledgment signal of the message packet to finish packet communications. Thus, the time until the source receives an acknowledgment signal after transmitting a message packet influences the forwarding rate. With this 'proxy response', since the relay 2 sends an acknowledgment signal on behalf of the destination, the forwarding rate of communications is enhanced. Moreover, the consumption of the battery in each wireless device can be reduced.

<Combined Embodiment>

'Return check' and 'cooperative forwarding' can be combined. With a combination of the two., the effects and synergistic effects of both technologies can be achieved. Further, in a communications method using an acknowledgment signal, 'proxy response' and 'return check' can be combined, and hence the effects and synergistic effects of both technologies can be attained. Moreover, 'proxy response', 'return check', and 'cooperative forwarding' can be combined, so that the effects and synergistic effects of the three technologies can be provided.

Specifically, in case 'return check' and 'cooperative forwarding' are combined, it is preferable to update carrier sense times after completion of 'return check' process shown in the flowchart of FIG. 6. In case 'return check' and 'proxy response' are combined, it is preferable to proceed to the 'proxy response' process after the 'return check' process. In case 'proxy response, 'return check', and 'cooperative forwarding' are combined, it is preferable to perform the 'proxy response' process after the 'return check' process and then proceed to the 'cooperative forwarding' process.

While the invention has been shown and described with respect to the embodiments, it will be understood by those skilled in the art that various changes and modifications may be made without departing from the scope of the invention as defined in the following claims.

What is claimed is:

1. A wireless mesh network system, which includes a plurality of wireless devices,
    wherein each of the wireless devices comprises:
    a transmitting unit, a receiving unit, a communications controller, and a RAM, and
    wherein the communications controller is adapted to determine whether a message packet received by the receiving unit is identical to a previously forwarded message packet that has previously been by the transmitting unit, said communications controller comparing information contained in the received message packet with information contained in the previously forwarded message packet and stored in the RAM,
    wherein the information stored in the RAM includes an original source address contained in the previously forwarded message packet, which is an address of a wireless device that has firstly transmitted the previously forwarded message packet, a packet type and a packet number that identifies the previously forwarded message packet,
    wherein the information contained in the received message packet includes an original source address, which is an address of a wireless device that first transmitted the received message packet, a packet type and a packet number that identifies the received message packet,
    wherein, if the original source address, the packet type and the packet number of the received message packet is consistent with those of the previously forwarded message packet, respectively, the communications controller determines that the received message packet is identical to the previously forwarded message packet,
    wherein, if the received message packet is different from the previously forwarded message packet, the communications controller is adapted to control the transmitting unit to forward the received message packet and control the RAM to store the information contained in the currently forwarded message packet, and
    wherein, if the received message packet is identical to the previously forwarded message packet, the communications controller is adapted to control the transmitting unit not to forward the received message packet.

2. The wireless mesh network system of claim 1, wherein the information contained in the previously forwarded message packet further includes a remaining number of retransmission attempts, which represents how many retransmission attempts remain to be allowed.

3. The wireless mesh network system of claim 1, wherein, the RAM stores information including the original source address, the packet type and the packet number for each previously forwarded message packet
    wherein, if it is determined that the received message packet is different from all previously forwarded message packets, the communications controller is adapted to control the transmitting unit to forward the received message packet and control the RAM to store the information contained in the currently forwarded message packet, and wherein, if it is determined that the received message packet is identical to any one of the previously forwarded message packets, the communications controller is adapted to control the transmitting unit not to forward the received message packet.

4. The wireless mesh network system of claim 3, wherein the information contained in the previously forwarded message packet further includes a remaining number of retransmission attempts, which represents how many retransmission attempts remain to be allowed.

5. The wireless mesh network system of claim 1, wherein the communications controller further detects a reception completion time of the message packet received, and controls such that,
if the wireless device performs forwarding, a carrier sense time which is the time from the reception completion time to the forwarding start time is set to an allowable maximum value, and
if the wireless device does not perform forwarding, the carrier sense time is set to a value lowered by one level.

6. The wireless mesh network system of claim 1, wherein, if the receiving unit receives an acknowledgement signal of a data message packet, the communications controller is adapted to control the RAM to store an original source address and a packet number of the data message packet which are contained in the acknowledgement signal, perform determination whether the original source address and the packet number of the received message packet are identical to those of the data message packet stored in the RAM, and control the transmitting unit to forward the acknowledgement signal, if the determination result is affirmative, and
wherein the wireless device forwarding the acknowledgement signal after the determination is different from a wireless device that first sends the acknowledgement signal.

7. A wireless device having a transmitting unit, a receiving unit, a communications controller, and a RAM, which is included in a wireless mesh network system,
wherein the communications controller is adapted to determine whether a message packet received by the receiving unit is identical to a previously forwarded message packet that has previously been forwarded by the transmitting unit, said communications controller comparing information contained in the received message packet with information contained in the previously forwarded message packet and stored in the RAM,
wherein the information stored in the RAM includes an original source address contained in the previously forwarded message packet, which is an address of a wireless device that first transmitted the previously forwarded message packet, a packet type and a packet number that identifies the previously forwarded message packet,
wherein the information contained in the received message packet includes an original source address, which is an address of a wireless device that first transmitted the received message packet, a packet type and a packet number that identifies the received message packet,
wherein, if the original source address, the packet type and the packet number of received message packet is consistent with those of the previously forwarded message packet, respectively, the communications controller determines that the received message packet is identical to the previously forwarded message packet,
wherein, if it is determined that the received message packet is different from the previously forwarded message packet the communications controller is adapted to control the transmitting unit to forward the received message packet and control the RAM to store the information contained in the currently forwarded message packet, and
wherein, if the received message packet is identical to the previously forwarded message packet, the communications controller is adapted to control the transmitting unit not to forward the received message packet.

8. A control method of a wireless mesh network system, which includes a plurality of wireless devices, each of the wireless devices having a transmitting unit, a receiving unit, a communication controller, and a RAM,
wherein the communications controller is adapted to determine whether a message packet received by the receiving unit is identical to a previously forwarded message packet that has been previously forwarded by the transmitting unit, said communications controller comparing information contained in the received message packet with information contained in the previously forwarded message packet and stored in the RAM,
wherein the information stored in the RAM includes controls an original source address contained in the previously forwarded message packet, which is an address of a wireless device that first transmitted the previously forwarded message packet, a packet type and a packet number that identifies the previously forwarded message packet,
wherein the information contained in the received message packet includes an original source address, which is an address of a wireless device that first transmitted the received message packet, a packet type and a packet number that identifies the received message packet,
wherein, if the original source address, the packet type and the packet number of received message packet is consistent with those of the previously forwarded message packet, respectively, the communications controller determines that the received message packet is identical to the previously forwarded message packet,
wherein, if it is determined that the received message packet is different from the previously forwarded message packet, the communications controller is adapted to control the transmitting unit to forward the received message packet and control the RAM to store the information of the currently forwarded message packet, and
wherein, if the received message packet is identical to the previously forwarded message packet, the communications controller is adapted to control the transmitting unit not to forward the received message packet.

9. The wireless mesh network system of claim 1, wherein the communications controller is adapted to determine whether an original source of the received message packet is identical to the wireless device to which it belongs by comparing the original source address contained in the received message packet with that preliminarily assigned to the communications controller, and
if the original source of the received message packet is identical to the wireless device to which the communications controller belongs, the communications controller is adapted to control the transmitting unit not to forward the received message packet.

10. The wireless mesh network system of claim 6, wherein the communications controller determines whether the receiving unit receives the acknowledgement signal of the data message packet by identifying the packet type of the received message packet.

* * * * *